United States Patent [19]

Norton, Jr. et al.

[11] Patent Number: 4,912,682

[45] Date of Patent: Mar. 27, 1990

[54] POINT LOCATION DETERMINATION AT OR CLOSE TO THE SURFACE

[75] Inventors: John P. Norton, Jr., Alajuela, Costa Rica; Michael A. Hall, Tonbridge; Ian N. Court, Orpington, both of England

[73] Assignee: Horizon Exploration Limited, Swanley, England

[21] Appl. No.: 245,006

[22] Filed: Sep. 15, 1988

[30] Foreign Application Priority Data

Sep. 16, 1987 [GB] United Kingdom ................ 8721748

[51] Int. Cl.$^4$ .............................................. G01V 1/38
[52] U.S. Cl. ...................................................... 367/19
[58] Field of Search ....................... 367/19, 15, 20, 127

[56] References Cited

U.S. PATENT DOCUMENTS

| | | | |
|---|---|---|---|
| 4,187,492 | 2/1980 | Delignieres | 367/19 |
| 4,376,301 | 3/1983 | Roberts | 367/19 |
| 4,660,185 | 4/1987 | French | 367/19 |
| 4,709,356 | 11/1987 | Ayers | 367/19 |

OTHER PUBLICATIONS

Geofix, Ltd., "Scope 3D, Navigation & Quality Control Data Logging Systems", 1/1987.

Primary Examiner—Thomas H. Tarcza
Assistant Examiner—Ian J. Lobo
Attorney, Agent, or Firm—Poms, Smith, Lande & Rose

[57] ABSTRACT

The application discloses a method of determining the relative positions of a plurality of points located substantially in a common plane at or close to the surface of the sea, which method comprises deploying at each of said points an acoustic element comprising an acoustic transmitter and/or an acoustic receiver; sequentially actuating at predetermined time intervals at least a predetermined number of the acoustic transmitters and observing the responses of at least a predetermined number of the acoustic receivers in response thereto, such that all of the acoustic elements are operated at least once, whether in the transmit or receive mode or in both said modes; and subjecting the observed responses to signal processing to derive the spacing between each receiving element and each transmitting element, and hence to derive the relative positions of said points.

16 Claims, 6 Drawing Sheets (a)

(b)

(c)

POINT LOCATION DETERMINATION AT OR CLOSE TO THE SURFACE

This invention relates to the determination of the relative positions of a plurality of points at or close to the surface of the sea. The invention finds particular application in underwater seismic testing and will be described hereinafter with reference to this application, although it is to be understood that the technique may be used for other applications and is not limited to its use in the field of underwater seismic testing.

The invention utilises multi-path acoustic ranging which, in its application to underwater seismic testing, is effected between multiple towed seismic detector arrays to determine the relative positions of a plurality of fixed points in, and from this data to determine the shape of, multiple towed seismic detector arrays.

Fundamentally, the marine seismic reflection method employs a sea-going vessel equipped with a seismic energy source which radiates a controlled wave field into the body of the earth, and an array of hydrophones (a streamer) which receives reflected seismic waves returning from geologic boundaries within the earth. In practice the seismic source is activated at regular intervals as the vessel navigates along lines on the sea surface that have been selected so as to overlie geological features in the sub-surface. Seismic data processing will yield a reflection profile which may be interpreted in terms of cross sectional geology beneath the seismic line. In 2-D (two dimensional) work the seismic lines are widely spaced (several kilometers) over an exploration area so that prospective hydrocarbon targets may be identified by correlating geologic features. In so-called 3-D work on the other hand, the aim is more to do with imaging the sub-surfaces to reveal subtleties not attainable through 2-D work. This implies a significant increase in areal density of sub-surface sampling. To meet the sampling requirement, the seismic vessel must steer the seismic source-streamer system along tightly gridded parallel lines separated by tens of meters and spread across the survey area, amounting to several thousand kilometers of survey programme. It has now become recognised practice to deploy more than one seismic streamer as a means of cutting the cost of 3-D surveys by reducing the number of programme lines traversed.

Oceanic conditions are such that seismic streamers rarely follow directly behind the vessel. A slight cross-current will cause the streamer(s) to "feather" and stray off the survey line, resulting in sub-surface coverage which is displaced lateraly from the intended survey line. It is our experience that current positioning techniques are inadequate and that errors are observed in the stacking and migration (imaging) phases of seismic processing, particularly for cross-lines, due to inaccurate co-ordinates being determined for the streamer(s). The absolute (geodetic) position of the vessel is known within an acceptable accuracy. What we are concerned with here is the relative position of the streamer(s). A maximum uncertainty of 5 meters in the sub-surface positions which equates to 10 meters at the surface will enable much improvement in 3-D seismic data processing and will directly influence the changes of oil discovery.

Hitherto, the determination of streamer shape and location has involved the use of remotely located compasses to derive the shape of a seismic streamer by fitting a smooth curve through individually observed streamer bearings relative to magnetic North. Knowledge of streamer shape is used to derive the coordinate positions of seismic detectors within the streamer(s).

In order unambiguously to ascertain the true orientation of the seismic cable for each compass location, the compass units must be free from local magnetic field distortion, or have such distortions accounted for. The amount of departure from the ideal is traditionally known as the deviation. Corrections must be applied to each compass individually and for all possible headings. Compass deviation is a phenomenon well known to the mariner who must refer to his compass correction card, provided during installation of the compass and particularly revised, to adjust for local effects so that he may steer a course corrected for all headings relative to magnetic North. When many compasses are used, as is the case with streamers, all it takes is one of the compasses to depart from its ascribed deviation to adversely affect the derived streamer shape. Relatively small discrepancies, say 0.5 degrees, can produce marked errors (tens of meters with a typical inter-compass spacing of 300 m) in the derived coordinate positions. Another correction, although this one applies to all compasses equally, is the "magnetic variation" or "declination" as it is sometimes called. As the magnetic and geographic poles ae not coincident, the magnetic North pole being in Northeastern Canada, the difference between the two poles must be accounted for at each point of observation on the globe so that true North observations are used to derive coordinate positions. An erroneous value of magnetic variation will introduce a specious rotation to all streamer shapes, resulting in a coordinate shift which can amount to hundreds of meters depending on the magnitude of error.

At the time of their manufacture, compasses are subjected to calibration against an established geodetic reference. This involves rotating the compass through many angular increments, say 15 degrees, in turn and comparing the compass registered heading to that observed by a surveying instrument pointed toward distant geographic markers. This factory calibration method involves many hours of tedious measurement. Albeit necessary for the manufacturing quality control to established specification, such a calibration can only relate to compass behaviour under laboratory conditions and has little to do with the actual conditions experienced by the compass when it is in use at sea.

Various attempts have been made toward field calibration. One calibration scheme involves several compasses developed within tens of meters on a special length of seismic streamer (calibration section). A series of traverses are performed by the seismic vessel along test headings, each of the streamer compasses could be expected to register the heading of each traverse. A systematic angular error, however could arise when the calibration section does not strictly remain orientated along the test heading. A systematic error of this nature may be easily removed by equally applying the average of all readings to each of the observations. Any residual effects may be ascribed to compass deviation. In practice there must be negligible curvature to the calibration section, or the average discussed above will not apply equally to all compasses. The folly of the calibration technique becomes apparent when the compasses, their environment having been so carefully controlled or in the calibration section, are moved into their functional positions along the working seismic streamer. By moving the compasses, their local environment and thus their behaviour will have changed. Experience has shown that when the compasses are in their normal places on the working seismic streamer, under conditions of negligible streamer curvature, discrepancies of up to one degree are not uncommon for compasses previously calibrated with confidence.

What is needed is a means to calibrate streamer compasses in situ or to augment the angular measurements with an independent technique, or perhaps to supplant the function of streamer compasses altogether. With the advent of multi-streamer seismic profiling we have developed a unique opportunity to exploit the system's geometry to achieve an independent means of determining the shapes of individual streamers which may thus address these needs.

According to one aspect of the present invention, there is provided a method of determining the relative positions of a plurality of points located substantially in a common plane at or close to the surface of the sea, which method comprises deploying at each of said points an acoustic element comprising an acoustic transmitter and/or an acoustic receiver; sequentially actuating at predetermined time intervals at least a predetermined number of the acoustic transmitters and observing the responses of at least a predetermined number of the acoustic receivers in response thereto, such that all of the acoustic elements are operated at least once, whether in the transmit or receive mode or in both said modes; and subjecting the observed responses to signal processing to derive the spacing between each receiving element and each transmitting element, and hence to derive the relative positions of said points.

In any application of the method of the invention, it is necessary to achieve a degree of redundancy in the response signals observed; we have found that it is generally last to have at least three-fold redundancy, i.e. at least 3n receivers should be used where there are n transmitters.

Each acoustic transmitter preferably emits a series of tonebursts covering a wide frequency range; this makes it possible to separate, in the frequency domain, the direct transmitter-receiver paths from the reflected paths (the strongest reflections being from the sea surface). Each such toneburst may have a duration of about 0.001 second. Typically four tonebursts separated in time by a few milliseconds will suffice. Each transmitter will normally have a different acoustic signature in order to provide a means of differentiation between the various acoustic sources.

As an alternative the same frequencies could be used, with discrimination between sources being achieved by transmitting within different time slots.

Preferably each of the acoustic elements can operate both as a transmitter and as a receiver. In this way, a time program can be utilised in which each element has a characteristic 'transmit time slot' and one or more 'listening' modes.

In another aspect, the present invention provides a method of determining the shape of two or more streamers deployed behind a seismic survey vessel, each of which streamers carriers a plurality of acoustic elements capable of operating in the transmit mode and/or in the receive mode, which method comprises sequentially actuating at predetermined time intervals at least a predetermined number of the acoustic elements in the transmit mode and observing the responses of at least a predetermined number of the acoustic elements operating in the receive mode in response thereto, such that all of the acoustic elements are operated at least once, whether in the transmit or receive mode or in both said modes; and subjecting the observed responses to signal processing to derive the spacing between each receiving element and each transmitting element, and hence to determine the shape of said two or more streamers.

For a better understanding of the invention, and to show how the same way be carried into effect, reference will now be made, by way of example, to the accompanying drawings, in which.

Figure 5:
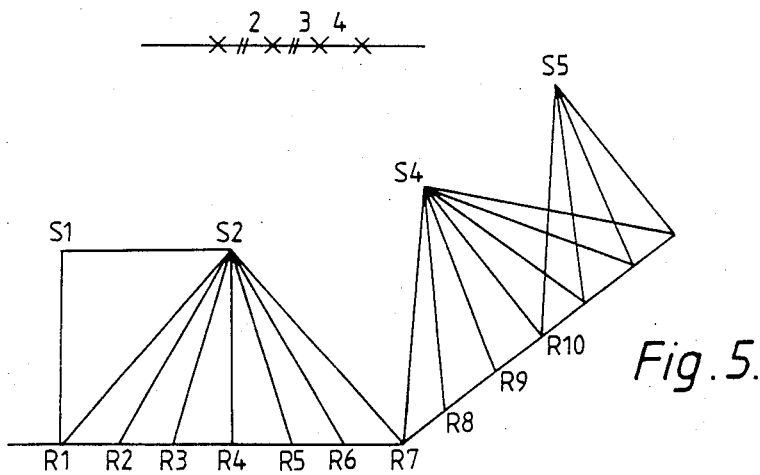
Figure 3:
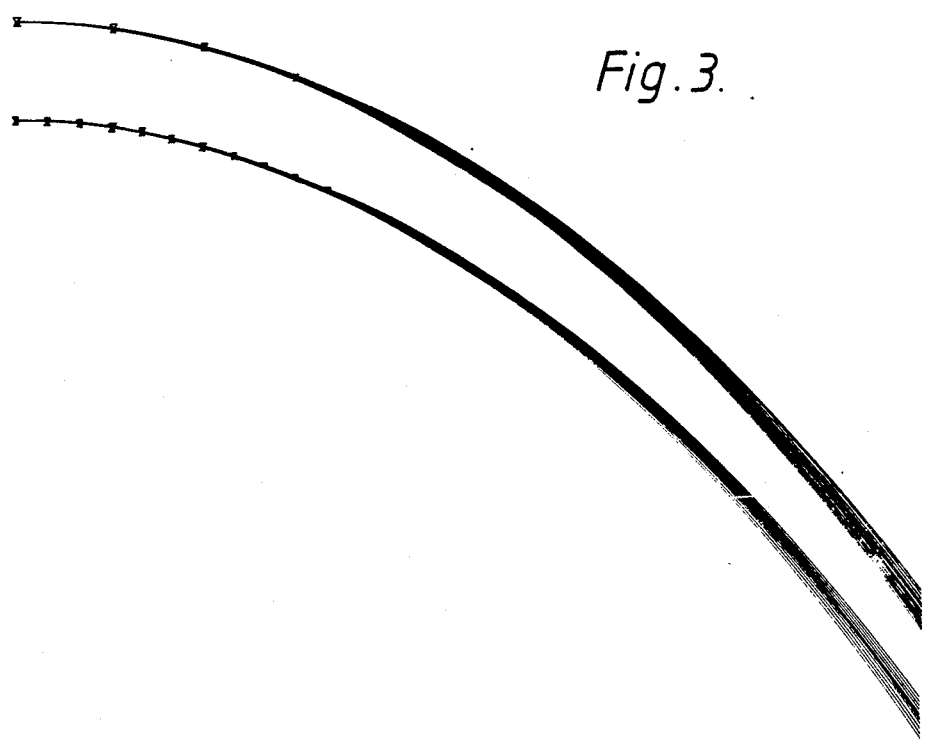
Figure 4:
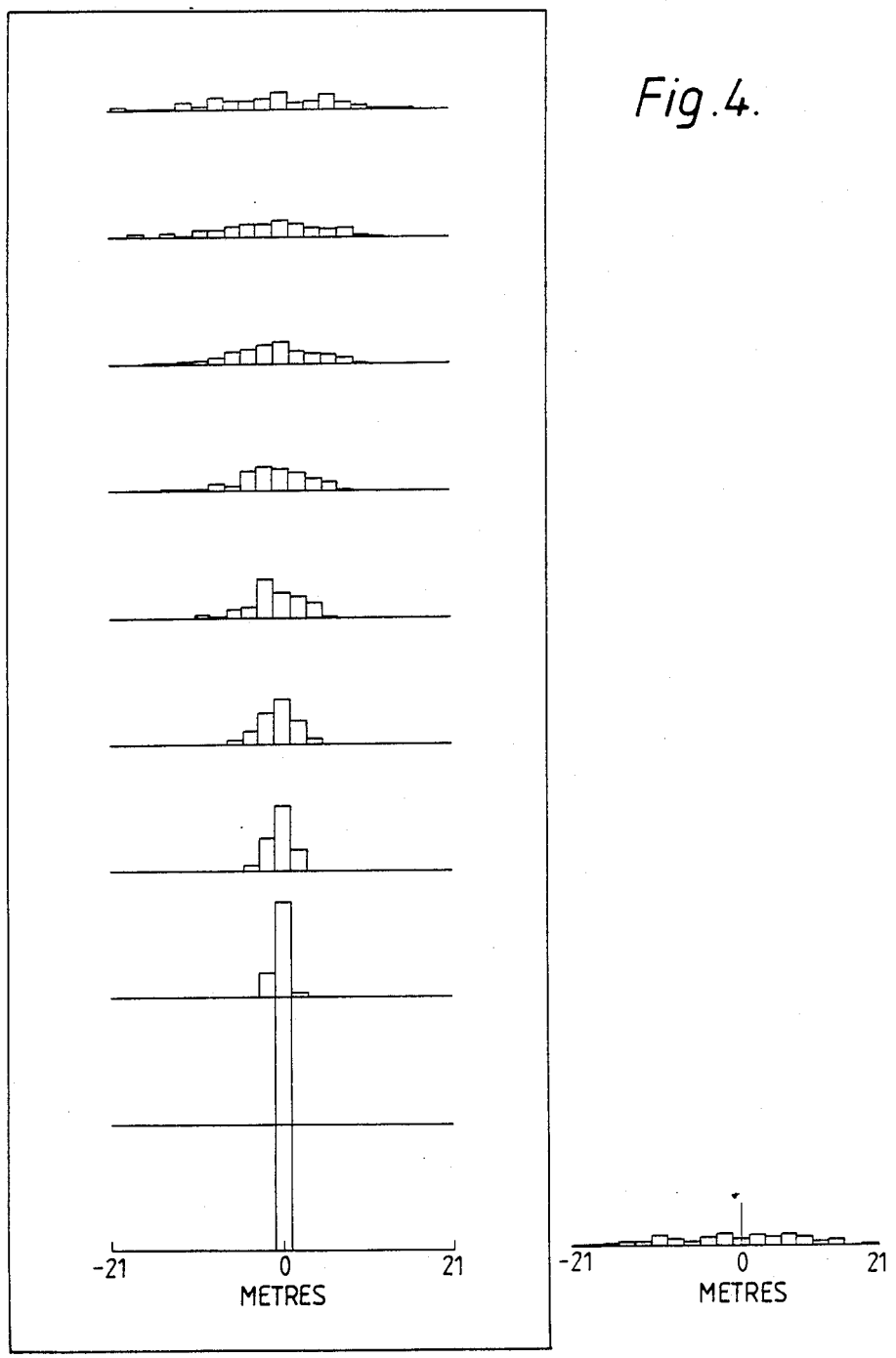
Figure 6:
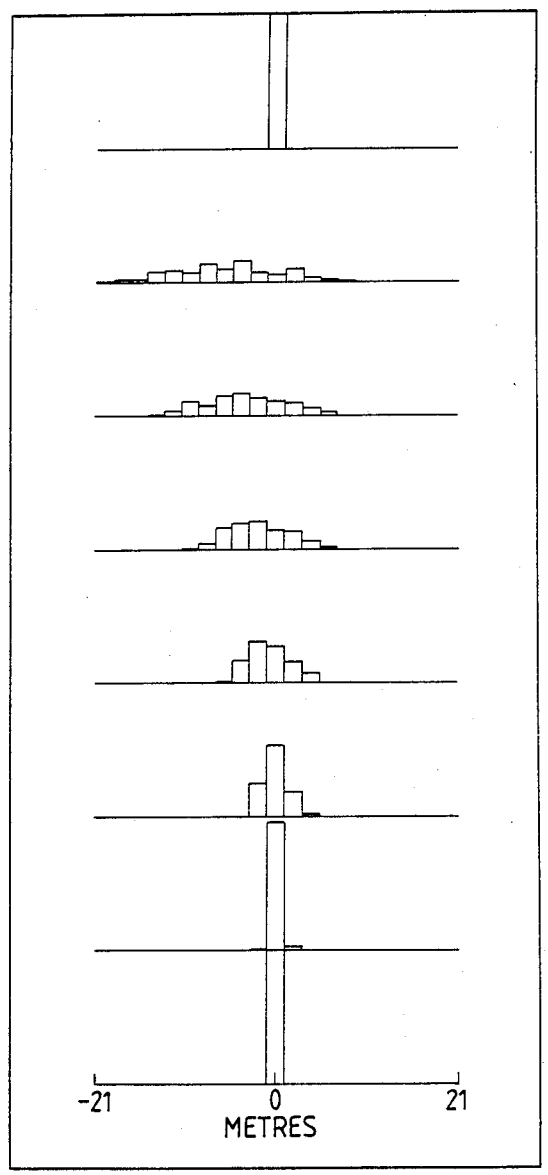
Figure 7:
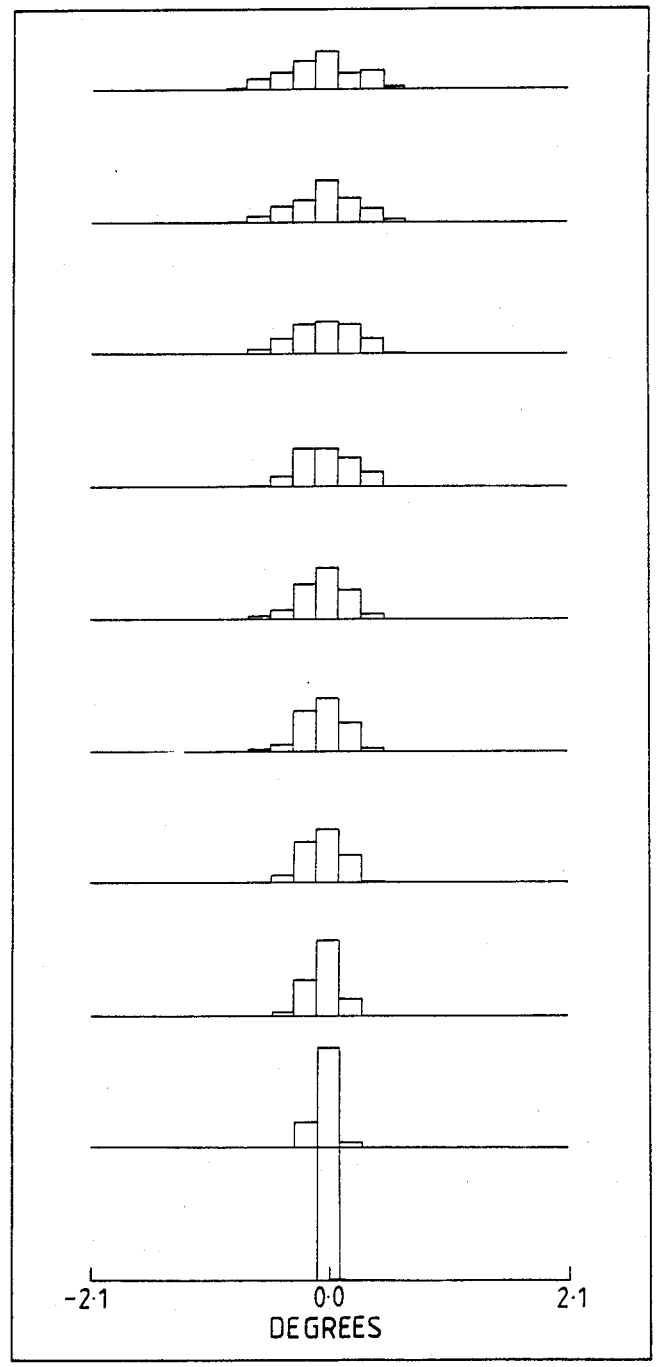

FIGS. 2B and 2C show a section of a streamer between the $j^{th}$ and $j+1^{th}$ transmitter showing the extra range measurements which would be made if the streamer is lengthened and the $j+1^{th}$ transmitter and 3 more receivers are added, the range measurements being numbered 1, 2, 3, ..., 7 and the extra extra installation measurements numbered 1, 2, 3, 4 in FIG. 2C;

FIG. 3 is a superposition of the streamer shapes as derived from 100 sets of measurements. The error in each measurement has been assumed to have zero mean and a standard deviation of 0.1 meters. No correction has been made for the systematic error caused by overestimation of the installation measurements arising because of the curvature of the streamers;

FIG. 4 is a histogram of the distributionary deviations from the theoretically calculated positions of the transmitters for the streamer shapes shown in FIG. 3;

FIG. 5 is a schematic representation of the streamers to illustrate a potential problem which can be overcome;

FIG. 6 is a histogram which illustrates a systematic error which arises if the spacing between any two adjacent devices becomes too large (e.g. by device failure) to allow adequate approximation of the arc separation by the chord separation, calculated from the derived streamer shapes shown in FIG. 3 with a device separation of 500m and a feathering angle of 11°; and FIG. 7 is a histogram of the distribution of compass data calculated from the derived streamer shapes shown in FIG. 3, with a device separation of 500 meters and a feathering angle of 11°; in this plot, the class size is 0.2 degrees and the mean value has been derived precisely from the theoretical streamer-model shape.

Figure 1:
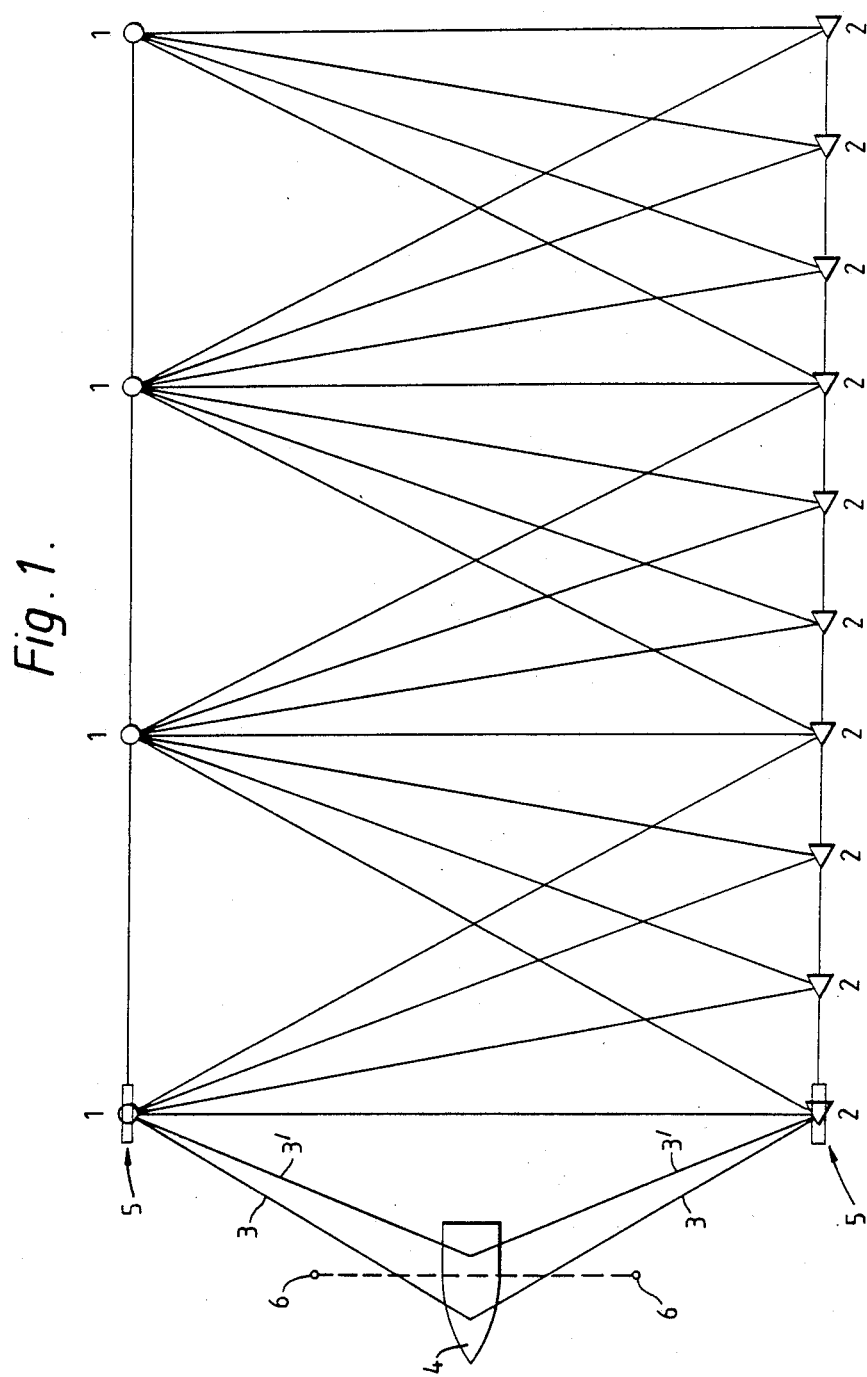
FIG. 1 is a diagrammatic reprfesentation of a survey vessel towing a pair of hydrophone streamers.

Referring to a dual streamer embodiment shown in FIG. 1, consider ultrasonic sonar transmitters labelled 1 positioned at 300m intervals along one streamer and receivers labelled 2 positioned at 100m along the other streamer. The choices of: deployment interval for transmitters and receivers, number of streamers, and all other matters related to a specific geometry are made for heuristic reasons which will become clear when the mathematical modelling is discussed.

On command each transmitter will emit a unique tone burst or series of tone bursts in an encoded sequence or a continuous varying tone as in a "chirp" signal to be received by a maximum of seven receivers in this embodiment, the reception period being such that signals arriving after a certain time are not registered i.e., the receivers are "time gated". In one preferred embodiment, sonar telemetry will be performed by local circuitry disposed within externally mounted pods which will communicate with the ship-based system through industry standard inductive couplers. In this preferred embodiment the system will physically resemble conventional streamer compass pods and will make use of the inductive coupling system already in the streamer(s). Nevertheless provisions could be made to accommodate the detectors within the seismic streamers, if for example the self noise generated by additional pods on the streamers becomes deleterious to the proper recording of seismic waves during the conduct of a survey. The sonar transmitters could likewise be located within the seismic streamers, but this may prove difficult to effect in practice due to space limitations and the lack of spare data telemetry capacity and remote power access within most digital seismic streamers. Nevertheless, future streamer designs may overcome these limitations and easily accept other sonar transmitter and receiver implants.

Hydroacoustic transducers tuned within the 50 to 150 kilohertz band preferably form the active acoustic elements to transmit and receive omnidirectionally from the remotely located battery powered pods. On demand from the seismic vessel, and by way of the inductive coupling system, each of the acoustic pods will be addressed individually and issued a trigger command synchronised to within the desired equivalent ranging accuracy. Each transmitter pod will be endowed with its own personality, i.e. have its own unique address, but more, will transmit a unique tone burst or tone bursts. Detection circuitry disposed within the acoustic pods will ascribe each arriving signal to its originating transmitter device and measure the time elapsed since last synchronisation. Those arrivals which fall within the receiver's time gate will either be converted to ranges by multiplication by the velocity of sound in water or remain as elapsed time measurements. In either case the information relating to the ranges between each transmitter and its associated receiver pods will be conveyed to a processing system aboard the seismic vessel. In the process just described acoustic pods distributed along adjacent streamers make ranging measurements to their counterparts on the other streamers (FIG. 2A), the number of receivers apportioned to each transmitter is dictated in terms of functionality by the allott d receiver time gate. As each range has emanated from a common transmitter and successive transmitter-receiver pairs overlap (FIG. 2B), a unique coordinate location may be calculated for each participating sonar unit.

Figure 2:
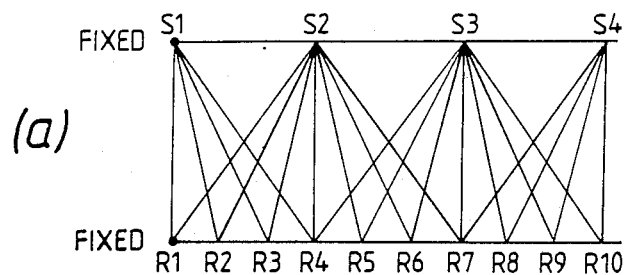
FIG. 2A is a schematic representation of two streamers having four sections showing relative positions of the transmitters S1, S2, S3 and S4, and the receivers R1, R2, R3 ..., R10, the lines between the streamers representing the acoustic range measurements which are to be made in accordance with this invention.
Figure 2:
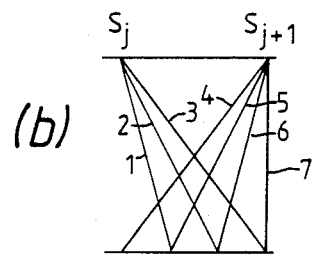
Figure 2:
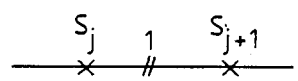

In the heuristic configuration shown in FIG. 2, the seismic streamers are 100 m apart. Transmitters range to seven receivers. Then for each such one to seven pattern the added length of streamer covered adds just seven acoustic measurements (FIG. 2B), but the inclusion of this extra section of streamer requires knowledge of the location of one extra transmitter and three extra receivers. Since each location is defined uniquely by local coordinate positions (easting and northing), these four extra pods introduce eight extra unknowns. More information is therefore required to balance the mathematical model. The number of measurements could be increased by increasing the pattern overlap from adjacent transmitters. Referring to FIG. 2A, if the signal from S3 is also received by R2 and R3, then after the first section of streamer, each subsequent section of streamer contributes nine measurements for the determination of eight unknowns. This overlap of patterns could be achieved if the transmitters were truly omnidirectional. However, the field of vision of devices attached to the streamer will be shielded somewhat and forward or reverse angles greater than 75 degrees cannot be expected. Even if this practical consideration could be overcome, measurements of these angles would be relatively insensitive to changes in the distances separating the streamers. An alternative approach would be to position the transmitters closer together. This would necessitate increasing the number of pods possibly inviting more self noise and certainly increasing processing time. A more productive approach to obtaining extra measurements is to use the knowledge of the distances along the streamer between the transmitters and receivers, which we will call the installation measurements. Thus if it can be assumed that the streamer is locally straight between adjacent pods we can approximate the arc length to the chord length and obtain four extra measurements for each section of streamer covered by a pattern. The physical devices now being employed enable us to measure the time it takes the acoustic wave to travel between these points; thus we have a direct method of measuring the local velocity of sound in water. Intuitively it would seem statistically advantageous to increase the number of degrees of freedom by making extra measurements e.g. between next nearest or next but one nearest neighbours along the receiver streamer. This, however, does not have the desired effect as these measurements are not independent and tend to force the streamer shape into an unyielding form. Given the foregoing considerations, the mathematical modelling was based on a heuristic system with dual 3 kilometer streamers have 11 transmitters spaced at 300 meters and 31 receivers spaced at 100 meters.

The location of the two points denoted as item 5 in FIG. 1 can also be determined using the multi-path acoustic ranging technique. However transducers fixed to the hull 4—indicated by lines 3 and 3'—even with maximum fore/aft separation would not usually provide an adequate base line. Thus booms need to be affixed to the ship's sides to support the acoustic transponders 6 as depicted by the dashed lines in FIG. 1 and to enable the fixing of the points 5. Therefore, the first transmitter—receiver path (S1 and R1 of FIG. 2) are considered to be the control points which uniquely locate the streamers in the vessel-based coordinate system. Ideally, since the length of the streamers is much greater than their separation, we would want to fix one point at each end of the streamers. One method has gained industry acceptance as a means to fix the extreme ends of the streamers. This involves the positioning of the tail buoys used to support the streamer ends. When used in conjunction with another system to fix the two points our streamer shape determination would elegantly fill in the intervening unknowns. However, the practical difficulties of maintaining an accurate determination of the tail buoy position render it useful only if similar accuracies are not possible through a combination of fixed tow points and multi-path acoustic ranging. Therefore, the following modelling results are based on knowing exactly the fixed baseline (points S1 and R1 of FIG. 2) to allow us to observe the range of errors to expect at the tail buoy for various acoustic ranging error models.

The full model configuration comprises 70 acoustic ranges and 40 installation measurements (the exact position of each transmitter and receiver along the streamers) making a total of 110 measurements to be used in determining the coordinate locations of 40 acoustic pods. The relationship between the measurements and the locations is complex, but two measurements is all that is required to fix uniquely each point. So one could, by starting from the known points S1 and R1 derive S2 and then R2 etc. The fundamental difficulty with this approach is that errors in the measurement cause geometric inconsistencies producing conflicting information. This problem is well known in surveying and one method for obtaining the best locations for the interacting system is that known as the variation of coordinates. This is an alternative procedure which starts from an arbitrary solution and derives a set of linear equations in the correction terms to be added to the initial assumption. These linear equations are reduced by a least square approach to a set of normal equations which are then solved. In general convergence is achieved after 3 or 4 iterations.

A synthetic model was created consisting of two streamers, each in the shape of a circular arc (FIG. 3). The tails had a feathering angle of approximately 11 degrees. The 110 measurements were calculated to the nearest millimeter. A computer program to apply the variation of coordinates technique to the data and using the Cholesky LU decomposition with back-substitution technique for solving the normal equations produced a set of points which fitted the curve everywhere to better than 0.1 meter. A notable feature was that failure to correct the points along the streamers for the curvature produced an error which increased with distance down the streamer and was of the order of 1.5 to 2 meters at the tail. This build up of erros in the pod coordinates is to be expected as it is the consequence of exactly fixing the tow points (S1 and R2 of FIG. 2).

Whilst it is satisfying that exact measurements give exact results, in practice the measurements will contain errors. We may expect errors in calculating the acoustic pod positions, nevertheless, what is important is how these errors affect our ability to meet the stringent positioning requirements of a 3-D seismic survey. There is no simple relationship between the measurement errors and the solution errors. An estimate of the precision of the solution can be obtained by deriving the variance—covariance matrix of the least squares estimate provided the elements of the weighting matrix have been accurately estimated. These weighting elements relate to the accuracy of each of the 110 measurements and are $1/\sigma_i 2$ where $\sigma_i$ is the variance of the $i^{th}$ measurement.

At the frequencies of interest and away from regions of high turbulance, acoustic-wave propogation losses in water are very low. Thus the signal strength at all receivers which can be coupled to any one transmitter should be independent of the travel time. Furthermore, although multi-path interference will increase with increasing time the noise power should be constant and thus the signal-to-noise ratio should, for practical purposes, be independent of range. Thus the accuracy of determining the travel times will only be limited by the bandwidth of the transmitted pulses and the precision of synchronisation. Conversion of these times to distances requires a knowledge of the local velocity of sound and of the vessel itself. In the open ocean there is little variation in the temperature and salinity (the major factors influencng sound velocity) over the 3 kilometer length of streamer at its working depth of between 5 and 10 meters. Therefore it is reasonable to assume a constant value for the velocity of sound. This implies that the accuracy of the distances between receivers derived from the ranging measurements will increase with distance. The logical consequence of this is that the tail position of the streamers will be most accurately determined by deploying just two transmitters and two receivers (one at the head and tail of each of the streamers, respectively).

Nevertheless, this would only be acceptable if the streamers were rigidly constrained to be straight. As this is far from the case in practice, this scheme would give rise to an unacceptable uncertaintiy in interpolating the intervening points between the streamer ends. Nonetheless, since the accuracy of determining the locations of stations does deteriorate with their increasing number, so the number to be used in practice should be the minimum consistent with deriving the cable shapes and the practical requirement of providing cover against failure of the devices.

In this embodiment, the actual locations along the streamers of the transmitters and receivers (the distance between them being defined as the installation measurements) is controlled by the location of the streamer-manufacturer-installed inductive coupling devices. Great care must be taken to ensure that the inductive coupling coil locations are known accurately and allowances made for the amount of stretching of the streamer under tension.

Using the model described above, we introduced random errors with zero mean into the range measurements and computed the positions of transmitters and receivers. Sets of results were obtained where the only errors were: (a) in the ranging measurements, (b) in the installation measurements, (c) in both the ranging and installation measurements. From one hundred different measurement sets, using a random error distribution with standard deviation of 0.1 meters, histograms showing scatter about the true mean in 2 meter intervals were plotted and are shown in FIG. 4. Errors of type (a) and (b) contribute nearly equally to the scatter about the mean. Increasing the standard deviation of the error distribution to 0.25 meters produces disproportionally large erosion in scatter about the mean. It should, however be practice to make measurements to within 0.1 meters, as required.

It is worthwhile to consider the implications of the velocity of sound on the accuracy of determining the pod locations. As errors of type (a) and (b) are independently ascribed to the streamer shape solution and appear to have equal effect, an error in one will become noticeable in the solution. Therefore if the velocity of sound constant is incorrect, this condition should be correctable by substitution of trial constants to bring the error types into parity. An independent check would be provided by triggering each transmitter in turn and registering the arrivals on all receivers. If the velocity is constant, the transmitted wavefront will radiate spherically and impinge on each receiver after a mathematically defined delay. Therefore the distances between receivers derived in this manner may be compared to their installation measurement, and the difference will relate to the chosen velocity of sound.

If one of the transmitters fails, S3 of FIG. 5 say, the ranging measurements between the streamers will not be possible and only the installation measurements—S2 and S3 and S3 to S4 will remain. If these distances are equal, then S3 may be at any position on the locus of points equidistant from S2 and S4. Thus the system is undefined and may hinge about R7. This type of system failure is amenable to either a software or hardware solution. The physical environment of the two streamers is very similar and they remain locally very parallel. Thus the distance S3 to R7 may be taken as the average of the closest approach measurements of the two neighbouring transmitters i.e. S2 to R4 and S4 to R10 (see FIG. 2). Alternatively, the hardware must report the error and locally redefine the transmitters and receivers in such a way as it would be if S3 never existed.

For the configuration we have been describing, the errors in the positioning of the transmitters gives rise to measurement errors which are much large than the error caused by assuming the distances between transmitters is the arc length. Therefore any curvature of the streamers can be ignored as a direct source of error. However, when the difference between arc length and the true spacing is of the order of 0.1 meters (this occurs in the present model when the transmitters are spaced at 500 meter intervals i.e., when there are only 7 transmitters over 3 kilometers) a systematic error is introduced to the solution (see FIG. 6). This puts an effective constraint on the minimum number of sources which must be employed; in this case, as 7 devices over 3 kilometers. The histograms of FIG. 6 show the deviation of the derived spacings (using the method of this invention) from the true spacing of 500 meters between devices for each of the devices in turn, the lowermost plot (with no deviation) being for the device at the head of the streamer, and each successive plot upwardly in the Figure being relative to the next device down the streamer, there being six derived sets of measurement in all. The uppermost plot is a marker which indicates the true position, i.e. with no deviation.

The variation of coordinates technique does not put any constraint on whether the devices used are transmitters or receivers, as longer as the correct number of each comprise a pattern. The devices employed in practice would be capable of both modes of operation. Any arrangement which conforms to the basic requirements outlined in the foregoing discussions may be used.

The variation of coordinates solution just fixes the points associated with transmitters and receivers, so for the modelled configuration, the streamer with the transmitters has its shape less well defined with only 11 points compared with the streamer with the receivers which is defined with 31 points. Modelling however, has shown that there is no theoretical advantage to the choice of 7 receivers coupled to each transmitter rather than say, 5 or 3. In practice, the modelled configuration of 11 transmitters and 31 receivers distributed along 3 kilometer streamers would not be attempted, excepting, perhaps, (a) on the grounds of providing redundancy against hardware failure, or (b) if the likely streamer shapes are complex enough to warrant spatial sampling of the order of 100 meters. Nevertheless, the condition of (a) may be created for by a software solution, and condition (b) would only be valid if one could assume that the increased spatial sampling of one streamer could be directly ascribed to the other(s). As the extra measurements have a direct impact on the amount of processing time required to derive the shapes and the exceptions posed as (a) and (b) above are not compelling, the preferred configuration is to place an equal number of transmitters and receivers along the streamers, the minimum number to be 7 over 3 kilometers with a corresponding increase if longer streamers are used.

Mathematical modelling has shown that with the two points of a pair of streamers known exactly and ranging between streamers perturbed by a randomly distributed error 0.1 meter standard deviation, the extreme ends of the cables (worst cable) will suffer a random cross-line error distribution with a standard deviation of 7 meters. These modelling results were used as the subject of a compass emulation study. Tangents were taken to the curves derived from each of the 100 sets of model ranging measurements to determine the streamer compass analogue to the multi-path ranging error results. The equivalent worst case error distribution was found to have a standard deviation of 0.3 degrees (FIG. 7). The histograms of FIG. 7 show the results for each of ten successively more remote devices on a streamer, that closest to the vessel being depicted in the lowermost plot. These results exceed our design aspirations for precision 3-D survey positioning control by giving the position of the streamers at all points along their length to within an uncertainty of 5 meters in the subsurface zone.

Under similar conditions to those simulated by the mathematical model, multi-path ranging would serve admirably as a means to calibrate streamer compasses in situ. If in practice the tow points of multiple streamers can be positioned to within an equivalent precision to the streamer shape, the tail ends of the streamers may be likewise positioned more accurately than is now possible using existing tail buoy positioning systems.

Multi-path ranging by a method in accordance with this invention could provide immediate benefit to seismic missions near the magnetic poles, where streamer compasses prove nearly useless. As multi-path acoustic ranging between streamers is integrated into existing seismic data acquisition systems it is realistic to expect that it will eventually supplant streamer compasses as a means to determine streamer shapes.

I claim:

1. A method of determining the relative positions of a plurality of points located substantially in a common plane at or close to the surface of the sea, which method comprises deploying a plurality of cables, with a plurality of said points being located on each of said cables; deploying at each of said points an acoustic element comprising an acoustic transmitter and/or an acoustic receiver; sequentially actuating at predetermined time intervals at least a predetermined number of the acoustic transmitters and observing the responses of at least a predetermined number of the acoustic receivers in response thereto, such that all of the acoustic elements are operated at least once, whether in the transmit or receive mode or in both said modes and such that each of the responses is received by more than one of the acoustic receivers; and subjecting the observed responses to signal processing which derives linear equations from an arbitrary solution, then reduces the linear equations to normal equations which are solved to derive the spacing between each receiving element and each transmitting element, and hence to derive the relative positions of said points.

2. A method according to claim 1, wherein the acoustic elements are constituted by the acoustic transducers of a streamer (hydrophone) array.

3. A method according to claim 1 or 2, wherein each acoustic transmitter is arranged to emit a series of tonebursts covering a wide frequency range.

4. A method according to claim 3, wherein the tonebursts of each transmitter are different from those of the other transmitters to constitute thereby an acoustic signature.

5. A method according to claim 3, wherein a plurality of the acoustic transmitters use a common frequency or frequency band but are arranged to emit their signals in different time slots.

6. A method according to claim 1, wherein each of the acoustic elements can operate both as a transmitter and as a receiver.

7. A method according to claim 2, wherein said signal processing step is performed in conjunction with data indicative of the distance between at least one of said points and a fixed point on the survey vessel.

8. A method according to claim 1, wherein there are at least three times as many receivers as there are transmitters.

9. A method as defined in claim 1, wherein each transmitted signal is received by a plurality of acoustic elements operating in the receive mode.

10. A method of determining the configuration of two or more streamers deployed behind a seismic survey vessel, said method comprising the steps of:
    (1) deploying said streamers with each streamer being provided with a series of acoustic transducers capable of being operated in the transmit or the receive mode, spaced along each said streamer;
    (2) coupling said streamers to said vessel for control and signal processing, with each transducer being uniquely identified;
    (3) actuating selected transducers to transmit unique acoustic signals identifying each transmitting transducer;
    (4) enabling a plurality of selected identified receivers to receive acoustic signals from the selected transmitting transducers;
    (5) transmitting received signal information to said vessel; and
    (6) processing the information relating to (a) the transmitted and received signals (b) the timed relationships thereof, (c) the spacing of the transducers, and (d) the general relative positions of the streamers, to determine the position of each transducer relative to the vessel.

11. A method according to claim 10, wherein the acoustic elements are constituted by the acoustic transducers of a streamer (hydrophone) array.

12. A method according to claim 10, wherein each acoustic transmitter is arranged to emit a series of tonebursts covering a wide frequency range.

13. A method according to claim 12, wherein the tonebursts of each transmitter are different from those of the other transmitters to constitute thereby an acoustic signature.

14. A method according to claim 10, wherein a plurality of the acoustic transmitters use a common frequency or frequency band but are arranged to emit their signals in different time slots.

15. A method according to claim 10, wherein each of the acoustic elements can operate both as a transmitter and as a receiver.

16. A method of determining the relative positions of a plurality of points located substantially in a common plane at or close to the surface of the sea, which method comprises deploying at each of said points an acoustic element comprising an acoustic transmitter and/or an acoustic receiver; sequentially actuating at predetermined time intervals at least a predetermined number of the acoustic transmitters and observing the responses of at least a predetermined number of the acoustic receivers in response thereto, such that all of the acoustic elements are operated at least once, whether in a transmit or receive mode in both said modes; subjecting the observed responses to signal processing which derives linear equation from an arbitrary solution, then reduces the linear equation by a least squares reduction to normal equations which are solved to derive the spacing between each receiving element and each transmitting element, and further wherein the Cholesky LU decomposition method with back-substitution is used to solve the normal equations to derive the relative positions of said points.

* * * * *